(12) United States Patent
Stockbower (10) Patent No.: US 7,169,302 B2
(45) Date of Patent: Jan. 30, 2007

(54) FILTER CARTRIDGE CONSTRUCTION

(75) Inventor: David Stockbower, Woburn, MA (US)

(73) Assignee: Entegris, Inc., Chaska, MN (US)

( * ) Notice: Subject to any disclaimer, the term of this patent is extended or adjusted under 35 U.S.C. 154(b) by 0 days.

(21) Appl. No.: 10/509,500

(22) PCT Filed: Feb. 11, 2003

(86) PCT No.: PCT/US03/04165

§ 371 (c)(1),
(2), (4) Date: Sep. 28, 2004

(87) PCT Pub. No.: WO03/082434

PCT Pub. Date: Oct. 9, 2003

(65) Prior Publication Data

US 2005/0178714 A1    Aug. 18, 2005

(51) Int. Cl.
*B01D 35/02* (2006.01)
(52) U.S. Cl. ............... 210/232; 210/443; 210/452; 210/493.2; 210/497.01
(58) Field of Classification Search ............... 210/232, 210/435, 440, 443, 444, 451, 452, 454, 455, 210/497.01, 493.1, 321.86, 493.2
See application file for complete search history.

(56) References Cited

U.S. PATENT DOCUMENTS

| | | |
|---|---|---|
| 3,118,836 A | 1/1964 | Briggs |
| 3,399,776 A | 9/1968 | Knuth |
| 3,460,680 A | 8/1969 | Domnick |
| 3,696,933 A | 10/1972 | Pall et al. |
| 3,850,813 A * | 11/1974 | Pall et al. .................... 210/232 |
| 4,028,254 A | 6/1977 | Shufflebarger et al. |
| 4,172,798 A | 10/1979 | Kronsbein |
| 4,316,801 A | 2/1982 | Cooper |
| 4,645,601 A | 2/1987 | Regunathan et al. |
| 4,678,576 A | 7/1987 | Leoncavallo |
| 4,719,012 A | 1/1988 | Groezinger et al. |
| 4,735,716 A | 4/1988 | Petrucci et al. |
| 4,876,005 A | 10/1989 | America |
| 4,948,505 A | 8/1990 | Petrucci et al. |
| 5,035,797 A | 7/1991 | Janik |
| 5,089,131 A | 2/1992 | Gentry |
| 5,114,572 A | 5/1992 | Hunter et al. |
| 5,133,858 A | 7/1992 | Walz et al. |
| 5,354,464 A | 10/1994 | Slovak |
| 5,548,893 A | 8/1996 | Koelfgen |

(Continued)

FOREIGN PATENT DOCUMENTS

EP         364299         4/1990

(Continued)

*Primary Examiner*—Matthew O. Savage
(74) *Attorney, Agent, or Firm*—John E. Pillion; Timothy J. King (57) ABSTRACT

A filtration module (10) is provided which includes a manifold (12), a filter cartridge (16) and a bowl (14) which houses the filter cartridge (16). The filter cartridge (16) and bowl (14) are connected to each other by a flange (15) on an end cap (30) of the filter cartridge (16) which fits into collar (34) on the bowl to form a unitary construction. The filter cartridge (16) and bowl (14) are in fluid communication with the manifold (12) in a manner which prevents mixing of a fluid feed to the module (10) and a permeate removed from the module (10).

8 Claims, 10 Drawing Sheets

U.S. PATENT DOCUMENTS

| | | |
|---|---|---|
| 5,549,821 A | 8/1996 | Bounnakhom et al. |
| 5,556,542 A | 9/1996 | Berman et al. |
| 5,591,329 A | 1/1997 | Davidson |
| 5,595,651 A | 1/1997 | Pavel |
| 5,609,757 A | 3/1997 | Schiavo et al. |
| 5,679,251 A | 10/1997 | Swanson et al. |
| 5,753,107 A | 5/1998 | Magnusson et al. |
| 5,837,137 A | 11/1998 | Janik |
| 6,006,924 A | 12/1999 | Sandford |
| 6,533,933 B1 | 3/2003 | Stankowski |
| 6,635,175 B2 | 10/2003 | Stankowski |
| 2001/0037969 A1* | 11/2001 | Stankowski ................ 210/348 |
| 2002/0014452 A1 | 2/2002 | Janik |
| 2002/0046969 A1 | 4/2002 | Bartsch et al. |

FOREIGN PATENT DOCUMENTS

| | | |
|---|---|---|
| EP | 0 657 201 A1 | 6/1995 |
| SU | 583810 | 1/1978 |
| SU | 605626 | 5/1978 |
| SU | 755291 | 8/1980 |
| SU | 528108 | 10/1996 |
| WO | WO 00/21640 | 4/2000 |
| WO | WO 01/26777 | 4/2001 |
| WO | WO 03/002228 | 1/2003 |
| WO | WO 03/002229 | 1/2003 |
| WO | WO 03/082435 | 10/2003 |

* cited by examiner

FILTER CARTRIDGE CONSTRUCTION

BACKGROUND OF THE INVENTION

The present invention relates to membrane filtration modules and a filtration cartridge that are more sanitary and are easier to replace and install than presently available filtration modules. More particularly, the present invention relates to a filtration cartridge and membrane filtration modules formed from a filtration cartridge, a reusable bowl, a reusable manifold and a reusable connecting device to connect the filtration cartridge, retaining bowl and manifold together.

The control of particulate contaminants in a filtration process such as in the semiconductor industry requires the use of ultraclean filters having membranes that remove submicron particles. It is well known that any particle that is deposited on a semiconductor wafer produces a defect when the particle is sufficiently large. Typically, in the semiconductor industry, failed defects can be produced by particles as small as about one tenth of the smallest features of the semiconductor chip. Therefore, membrane filters are used in every process step for producing semiconductor chips to purify both working liquids and gases.

Although many different designs have been developed for a filtration module used in an ultrapure liquid filtration, two designs are prevalent. In one module design, liquid to be filtered flows from one end of the filtration module to the other end. In this class of filtration modules, the feed and permeate connections are located at opposite ends of the filter thereby forcing the liquid flow to move from one end to the other. This flow configuration is referred to as an in line flow configuration. These filtration modules suffer from two disadvantages. First, they are more difficult to connect to the process equipment since the module is sandwiched between two sets of connections. Second, any free liquid remaining within the module quickly drains upon disconnection of the module because at least one connection is positioned at the bottom of the module.

A second filtration modular design locates all of the connections at the same end of the module. In this type of module, the feed and permeate ports are typically horizontally oriented at the top of "head" end of the module on opposite sides thereof. Due to their shape, these modules are referred to as having a T configuration. The T configuration facilitates connection of the head to the remaining portion of the filtration module comprising the bowl and the filtration cartridge positioned within the bowl. In this design, the bowl and filtration cartridge comprise separate elements. Thus, when constructing the filtration module, the filtration cartridge and the bowl are separately secured to and sealed to the manifold head. In addition, upon completion of filtration, the bowl and cartridge are separately removed from the head. This separate removal requires that the bowl be moved a distance substantially greater than the entire length of the cartridge thereby exposing the cartridge to permit its removal. Thereafter, the exposed cartridge is removed by hand or with a hand tool. Since the filter cartridge is saturated with the liquid being filtered which is often times corrosive or toxic, the cartridge removal step presents a danger to the worker. In addition, since the bowl must be moved the length of the cartridge, the space within which the bowl and cartridge are positioned must accommodate this removal step.

It has been proposed in U.S. Pat. No. 5,114,572, to provide a filter assembly which cooperates with a bowl to produce a filter cartridge-bowl construction which can be demounted as a single unit from a manifold. The filter cartridge is connected to the bowl by bayonet connections on the cartridge which fit into grooves within the interior surface of the bowl. The filter bowl is directly attached to the filter head by a bayonet connection that fits into slots in the head. The cartridge fits into the bowl at a position below the top of the bowl where the bowl-head connection is effected. Since the bowl is narrower at the bowl body than at the top of bowl, the bayonet connection at the narrow portion of the bowl increases blockage of fluid through the bowl.

Accordingly, it would be desirable to provide a cartridge-bowl connection which minimizes fluid blockage by positioning a cartridge-bowl connection at the top of the filter medium portion of the cartridge. In addition, it would be desirable to provide such a cartridge having a connection means which are clearly visible so that connection of the cartridge to the bowl is facilitated. Such a cartridge would promote ease of inserting the filter cartridge into the bowl, would eliminate the danger to the worker in removing the filter cartridge subsequent to filtration and would reduce the space required to install the filtration module.

SUMMARY OF THE INVENTION

In accordance with this invention, a filtration module is provided comprising a manifold, and the combination of a filtration cartridge and bowl wherein the filter cartridge and bowl are locked together to be installed and removed as one piece from the manifold. The filtration cartridge comprises a filter medium sealed at both ends with an end cap. One of the end caps includes at least two flanges and a fluid passageway for fluid communication between the manifold and the interior of the cartridge. The flanges extend outwardly from the end cap and beyond an outside vertical surface of the filter medium. The flanges are designed to fit into slots in the bowl thereby to effect connection of the cartridge to the bowl. The end cap and flanges are positioned above the filter medium so that the flanges can be connected to the top portion of the bowl. The flanges on the end cap which secure the cartridge to the bowl permit the cartridge and bowl to be removed as one piece from the manifold. In one aspect of this invention, an end cap having at least two flanges is provided. The end cap can be bonded to an end of a filter cartridge of any construction so that the filter cartridge can be secured to a bowl. In another aspect of this invention, a bowl is provided which has a collar having at least two slots which accommodate the flanges of the end cap. The bowl and collar can be unitary construction or can be formed from two separate pieces which can be joined such as with screw threads.

DESCRIPTION OF SPECIFIC EMBODIMENTS

The present invention provides a filter cartridge and a filtration module formed of a manifold, the filtration cartridge and a bowl. The manifold provides fluid pathways for fluid feed into the filtration cartridge and permeate removal from the filtration cartridge. The bowl provides a means of storing fluid feed to permit its introduction into the filtration cartridge or to store permeate from the filtration cartridge to be directed to the manifold and then from the filtration module. Fluid feed can be introduced into the filtration cartridge through the manifold either from the outside of the filtration cartridge or from within the interior of the filtration cartridge. The fluid in the bowl adjacent the filtration cartridge can be either fluid feed or permeate. In any event, the fluid feed is introduced from a manifold into the filtration cartridge, permeate is removed from the filtration cartridge from the manifold and sealing is provided to prevent admixture of fluid feed and permeate.

The filtration cartridge and bowl are constructed so that they are sealed with the manifold or removed from contact with the manifold as one piece. The filtration cartridge is sealed with two end caps, one of which is provided with a fluid passageway. The cartridge is provided with an end cap having at least two flanges formed integrally therewith and with a fluid passageway of the cartridge. The fluid passageway can function as an inlet or outlet of the cartridge. The flanges are configured to effect locking of the cartridge to the top portion of the bowl. Since the flanges are positioned above the filter medium, the cartridge can be secured to the top portion of the bowl having a larger diameter than the body of the bowl fluid blockage by flange is less than that when the flanges are positioned between the cartridge and the body of the bowl. Subsequent to a filtration, the bowl and filter cartridge are removed from the manifold as a single piece rather than as two separate pieces. Since the bowl and filter cartridge are removed together, the filtration cartridge need not be removed from the bowl. Thus, a space substantially equal to the length of the filtration cartridge and the bowl together need not be provided to remove the filtration cartridge. Only a space as long as substantially the length of the bowl need not be provided. This permits one to install a filtration cartridge of this invention within a smaller space as compared to the space required with present filtration modules. In addition, since the filtration cartridge is removed with the bowl, it need not be handled by a worker either by hand or with a hand tool. This substantially reduces the possibility of contacting fluid within the bowl with a worker. The bowl optionally can contain a drain for removing fluid before removal.

In one aspect of this invention, an end cap is provided which can be bonded to an end of a filter cartridge. The end cap includes at least two flanges which can be fit into slots in a bowl so that the filter cartridge can be secured within the bowl. The end cap also is provided with a fluid passageway which can be utilized either as a fluid inlet to the filter cartridge or a fluid outlet from the filter cartridge.

In another aspect of this invention, a bowl is provided which has a collar with at least two slots which extend through the thickness of the collar. The slots accommodate the flanges of the cap to provide a means for securing the filter cartridge within the bowl. The collar and bowl can be of unitary construction of from two separate elements that can be joined together such as with screw threads.

Figure 1:
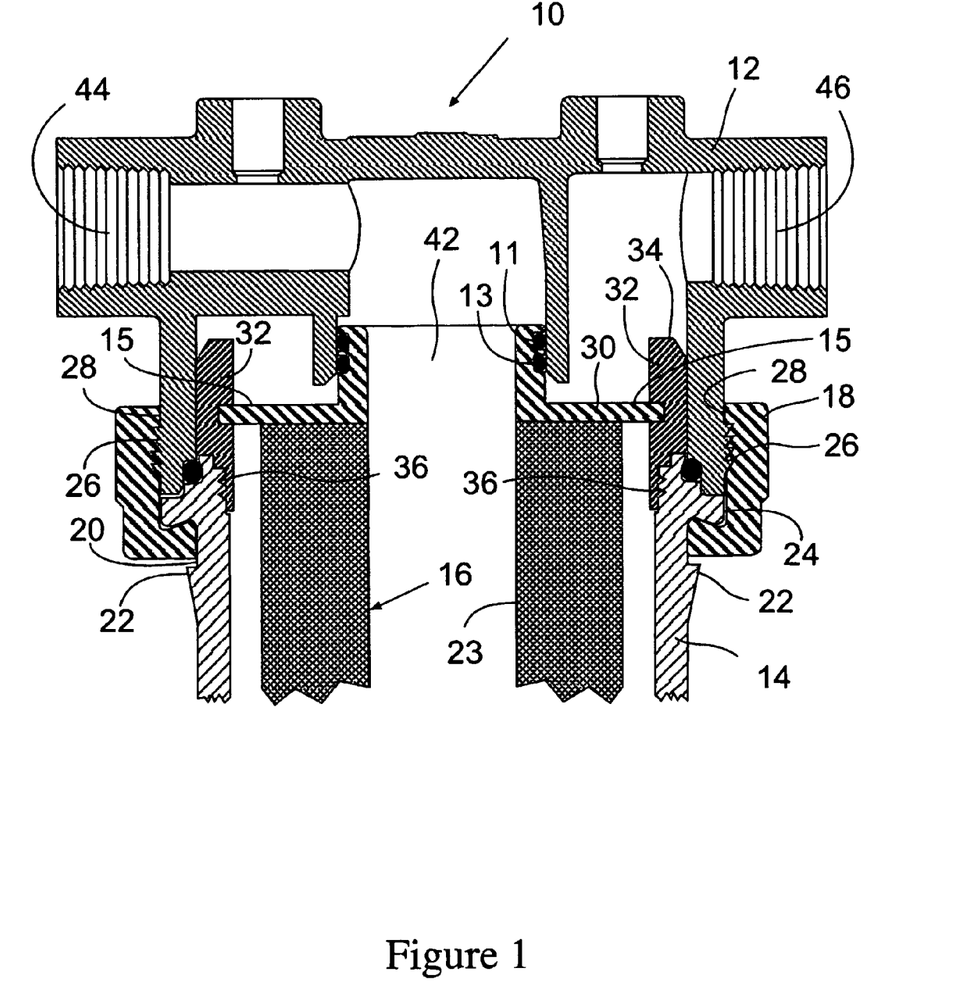
FIG. 1 is a cross sectional view of a filter module of this invention.

Referring to FIG. 1, a filtration module 10 comprises a manifold 12, a bowl 14 and a filter cartridge 16. A threaded ring 18 is positioned on the outside surface 20 of bowl 14 and is retained thereon by bead 22 which extends around the circumference of the bowl 14 and lip 24. By controlling the size and flexibility of bead 22, the ring 18 can be slipped over the bead 18 to position the ring 18 or the bead 22 can be formed on the bowl 14 after the ring 18 is positioned as shown.

The ring 18 is substantially fixed in its position relative to the bowl 14, i.e., it cannot move any substantial distance along the length of the bowl 14. When its threads 26 and 28 are drawn together, the ring 18 carries or drives the cartridge 16 into affirmative contact with manifold 12 to effect sealing with O-rings 11 and 13. Conversely, when the ring 18 is rotated so as to drive the threads 26 and 28 apart, the cartridge 16 is positively carried or driven away from the manifold 12. Sealing of the bowl 14 to the abutting manifold 12 is effected by O-ring 17. The bowl is moved into contact with the manifold 12 vertically without rotating the bowl 14.

The cartridge 16 is connected to bowl 14 by flanges 15 on end cap 30 which mate with slots 32 in collar 34. The collar 34 is threaded into bowl 14 by threads 36. The collar 34 extends about the entire inner circumference of bowl 14. Alternatively, the bowl and collar can be formed of one piece in the shape of bowl 14 and the collar 34 such as by molding. Fluid passageway 42 includes sealing O-rings 11 and 13 and can function as an inlet or outlet for cartridge 16. When the fluid passageway functions an inlet, fluid is introduced into inlet 44 of manifold 12. When the fluid passageway 42 functions as an outlet, fluid is introduced through inlet 46 of manifold 12. Since flanges 15 do not extend about the entire circumference of the key 30, fluid is capable of by-passing the end cap 30 to flow into the manifold 12.

Figure 2:
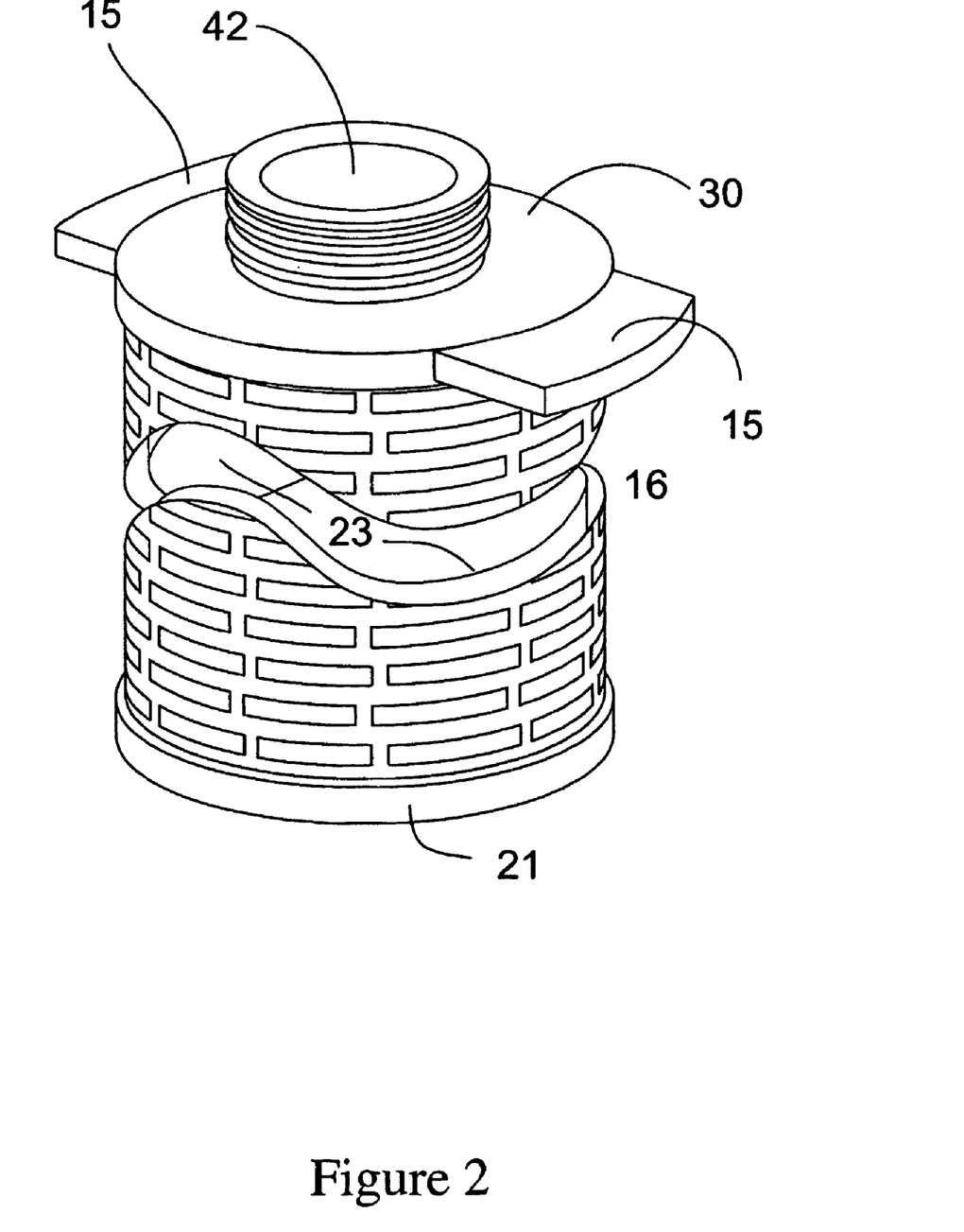
FIG. 2 is an isometric view of a filtration cartridge top of this invention.

Referring to FIG. 2, the filter cartridge 16 includes a top cap 30 having flanges 15 formed integrally therewith, a bottom cap 21, a filter 23 and a porous housing 25. The flanges 15 extend outwardly from the vertical surface 25. The caps 30 and 21 are sealed to the ends of the filter 23 to prevent admixture of fluid feed with permeate. The structure of the filter cartridge 16 assures that fluid entering the filter cartridge 16 passes through the filter 23 prior to exiting the filter cartridge 16. The filter 23 can be a depth filter, a pleated filter or the like.

Figure 3:
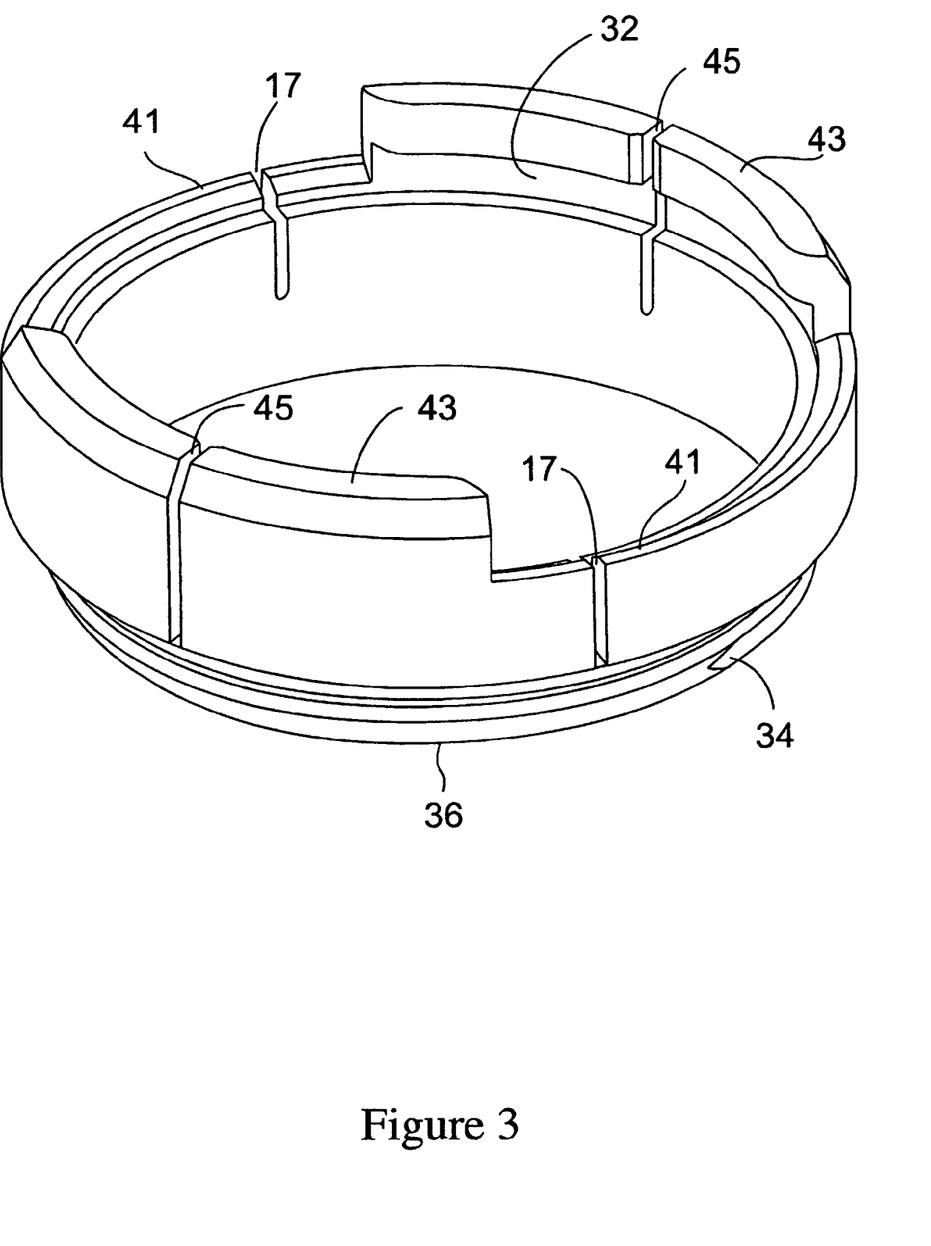
FIG. 3 is an isometric view of a collar used in conjunction with the cartridge of FIG. 2.

Referring to FIG. 3, the collar 34 includes two cutouts 41 and two vertical extensions 43. Each vertical extension 43 includes a slot 32 (one not shown). The slots 32 fit with and accommodate flanges 15. The angle subtended by slots 32 depend upon the flexibility of the material used to make end cap 30 and collar 34. The slots 32 subtend an angle of at least about 15 degrees, preferably between about 30 and about 45 degrees when the end cap 30 and collar 34 are made of relatively flexible polymer of perfluoro(alkylvinyl ether) (PFA). When the end cap 30, flanges 15 and collar 34 are made of relatively rigid material such as high density polypropylene, these angles can be about one-half that for PFA. This size angle with these exemplary materials provides a desired contact surface between the flanges 15 and the slots 32 so that the end cap 30 is not separated from the collar 34 during use of the filtration module 10. The collar 34 can include detents. The collar 34 also includes optional vertical slots 17 which permit drainage of fluid between the collar 34 and the manifold 12.

Figure 4:
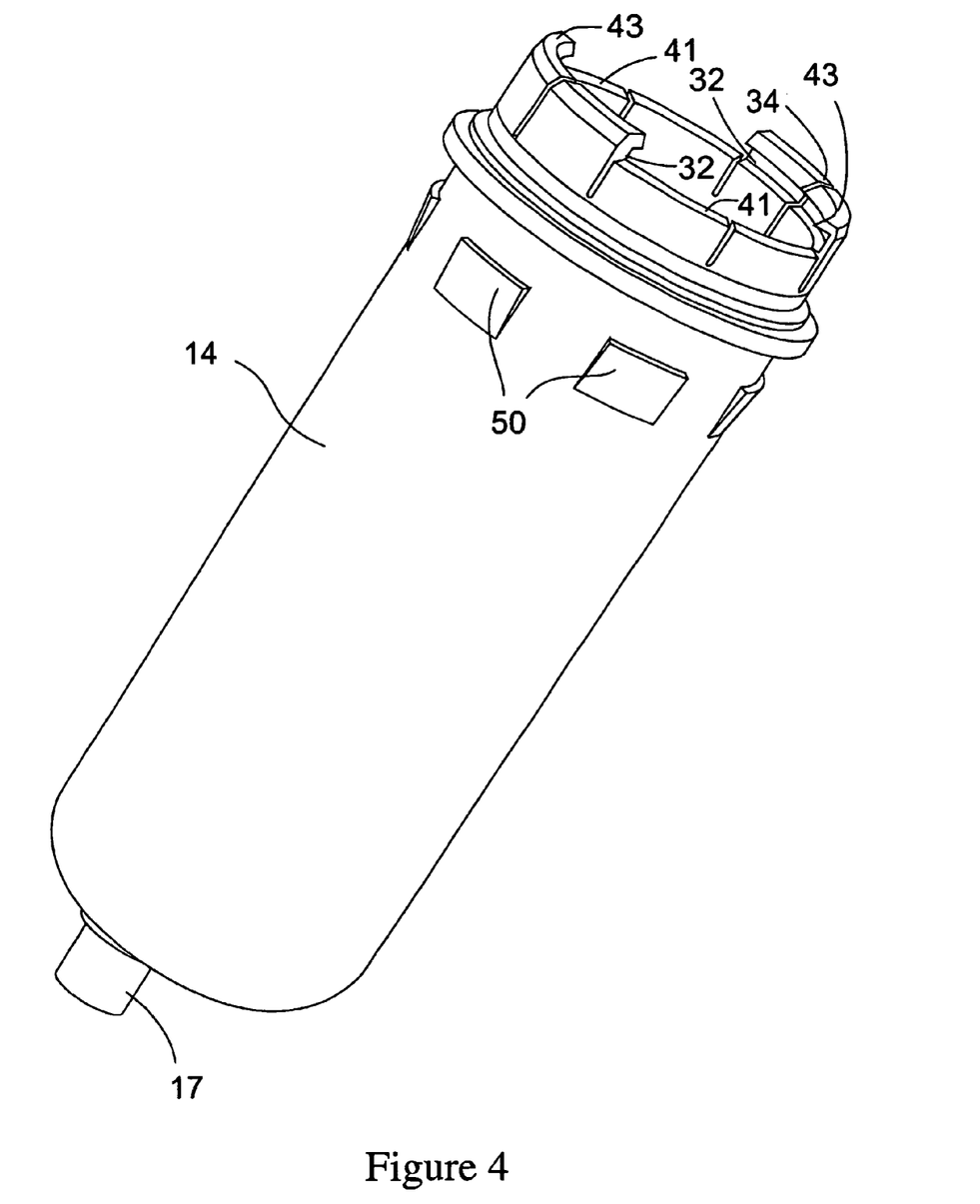
FIG. 4 is an isometric view illustrating a bowl and collar of this invention.

Referring to FIG. 4, a bowl and collar construction of this invention is shown. The collar 34 is threaded into the bowl 14. Alternatively, the collar and bowl 14 can be molded as one piece. The bowl 14 includes a plurality of stops 50 which support a locking ring (not shown). The bowl 14 includes a drain 17 that can be open or closed. The drain 17 is closed during filtration.

While the end cap of this invention has been described with reference to two opposing flanges, it is to be understood that the end cap can be provided with more than two flanges. At least two flanges are required in order to prevent the cartridge from pivoting with respect to the bowl. The orientation and angle subtended by the flanges 15 are such as to permit their insertion into the slots 32 of collar 34.

The embodiment of FIG. 2 is inserted into the collar of FIG. 3 by aligning the flanges 15 with cutouts 41. The end cap 30 and filter cartridge 16 are then rotated so that flanges 15 fit into slots 32 thereby securing the cartridge 16 to the collar 34.

In one aspect of this invention, the key is provided with an outside surface configuration which mates with an inside surface configuration of the collar attached to the bowl in order to center the filter cartridge to which it is attached within the bowl. Centering the cartridge within the bowl allows for a smooth mating of the key and collar when the key is rotated into the collar. The outside surface configuration of the key includes a small groove. While this outside surface configuration is not required in this invention, in its absence, the key will slide from side to side within the collar thereby increasing difficulty of engaging the key and collar.

Figure 5:
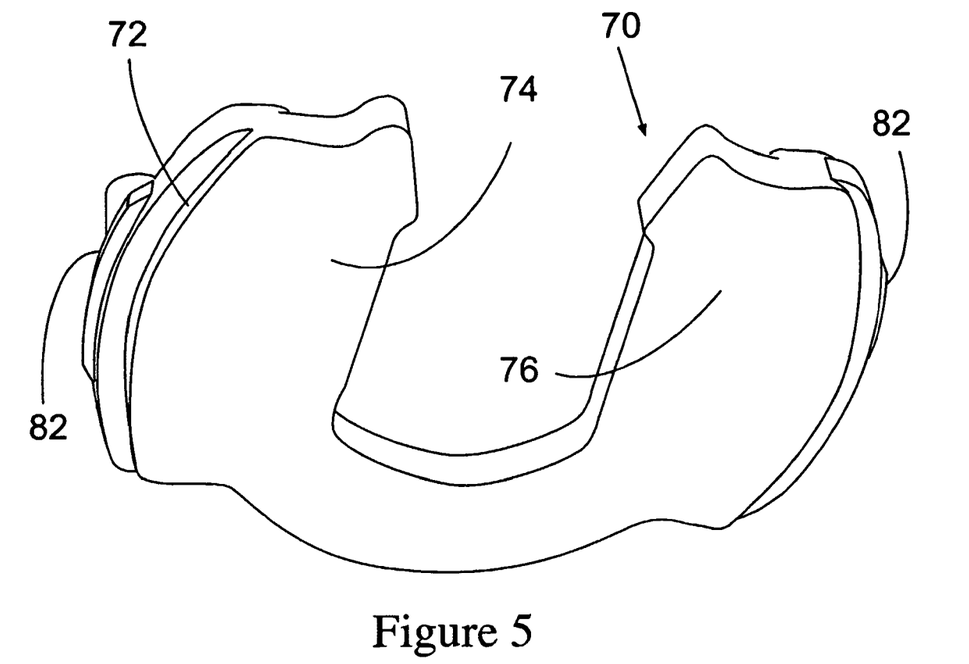
FIG. 5 is a bottom perspective view of an alternate key of this invention.
Figure 6:
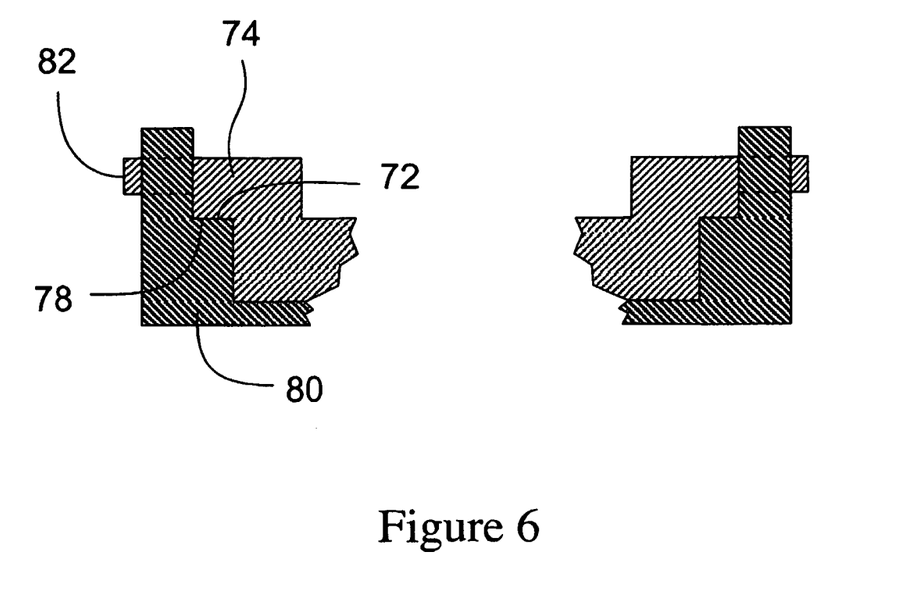
FIG. 6 is a partial cross sectional view of the position of the key of FIG. 5 on the collar shown in FIG. 7.

Referring to FIGS. 5 and 6, the key 70 includes a groove 72 on each key leg 74 and 76 which mates with a surface 78 of collar 80. While FIGS. 9 and 10 include bosses 82, they are not necessary to the groove's 72 function. The purpose of the bosses 82 are described below.

Figure 10:
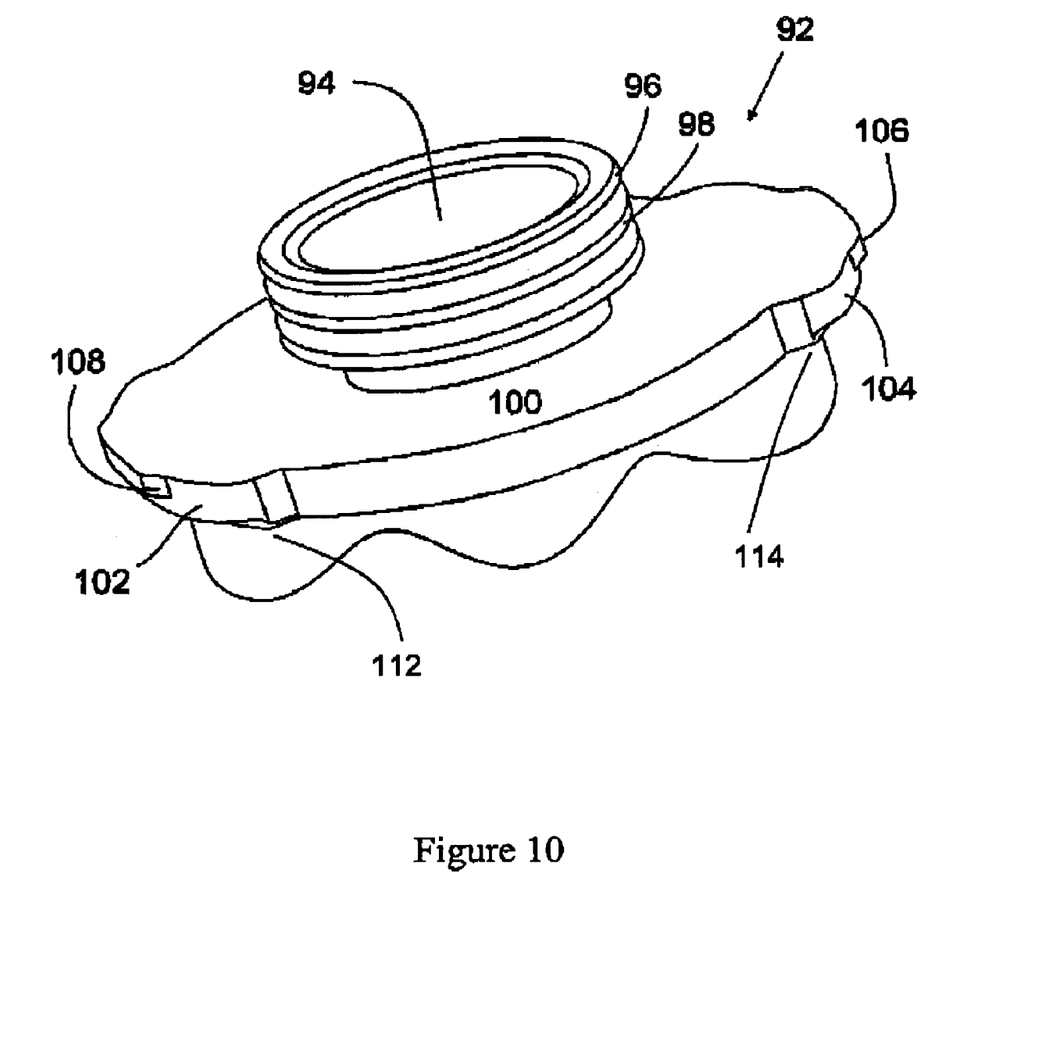
FIG. 10 is a perspective view of an end cap of this invention.

In another aspect of this invention, the collar of this invention is provided with slots which extend through the thickness of the collar. The slots mate with bosses on the key to provide an improved fit between the collar and the key, The bosses are configured to cause portions of the collar including mating slots to expand outwardly when the key is rotated into position until the bosses fit into the open slots. The bosses 106 and 108 illustrated in FIG. 10 are configured with an angled edge that causes the mating slots on the collar to expand outwardly when the key is rotated into position until the bosses fit into the open slots. At the point of fitting, the slots contract toward each other and thus overlap with the bosses rendering it more difficult for the key to become detached from the collar during use.

Figure 7:
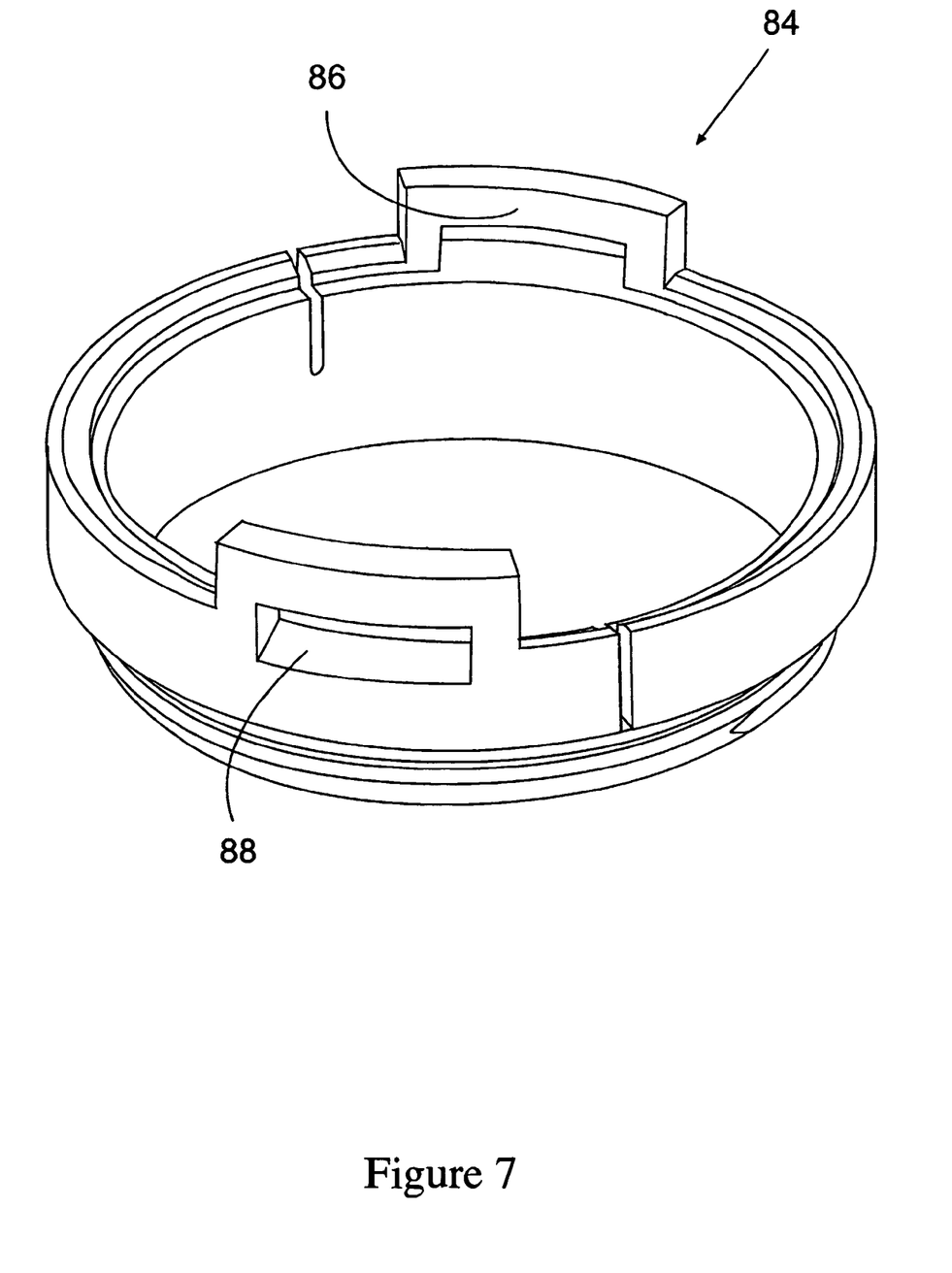
FIG. 7 is a perspective view of a collar having slots to accommodate the key of FIG. 5.
Figure 8:
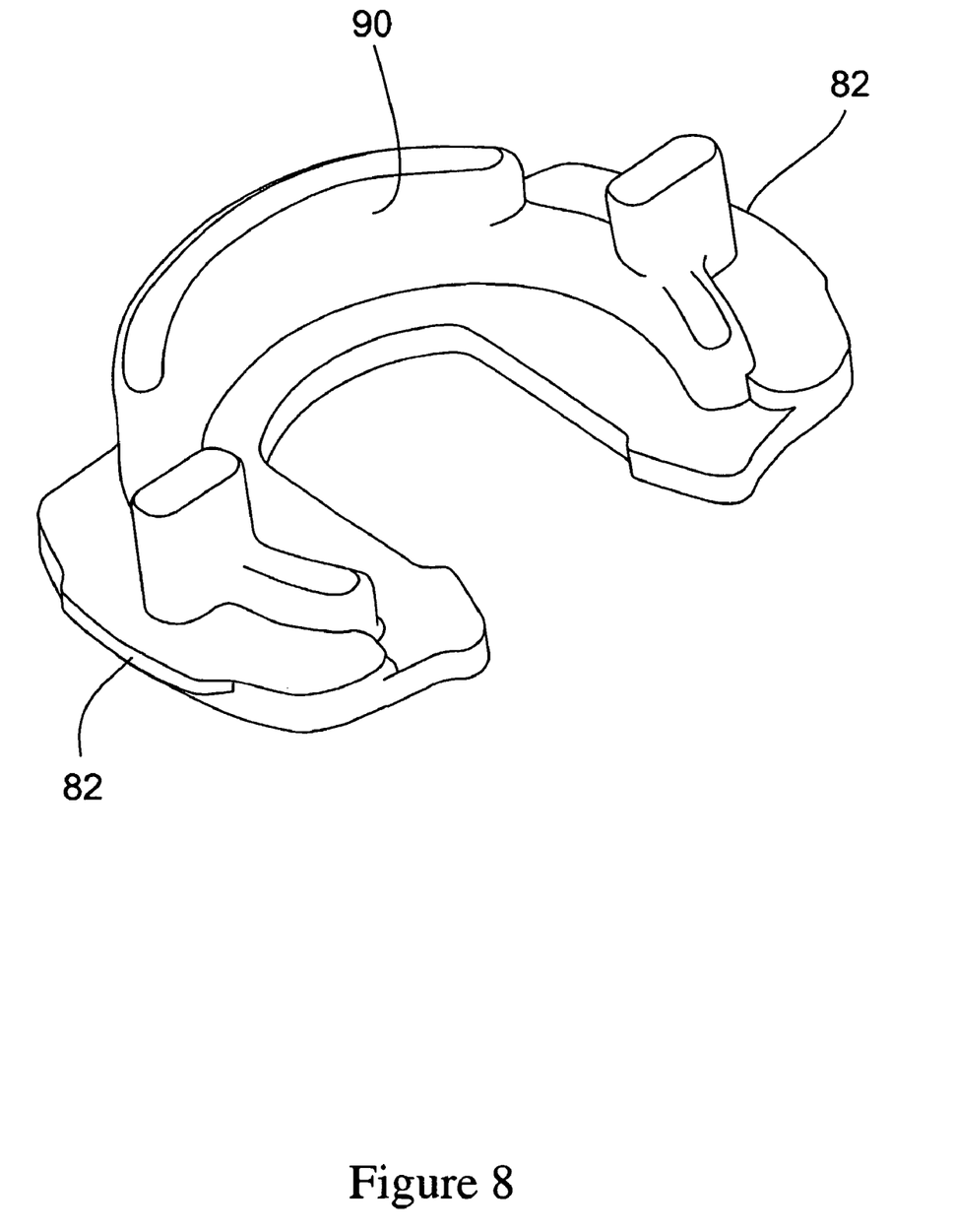
FIG. 8 is a top perspective view of an alternate key of this invention.
Figure 9:
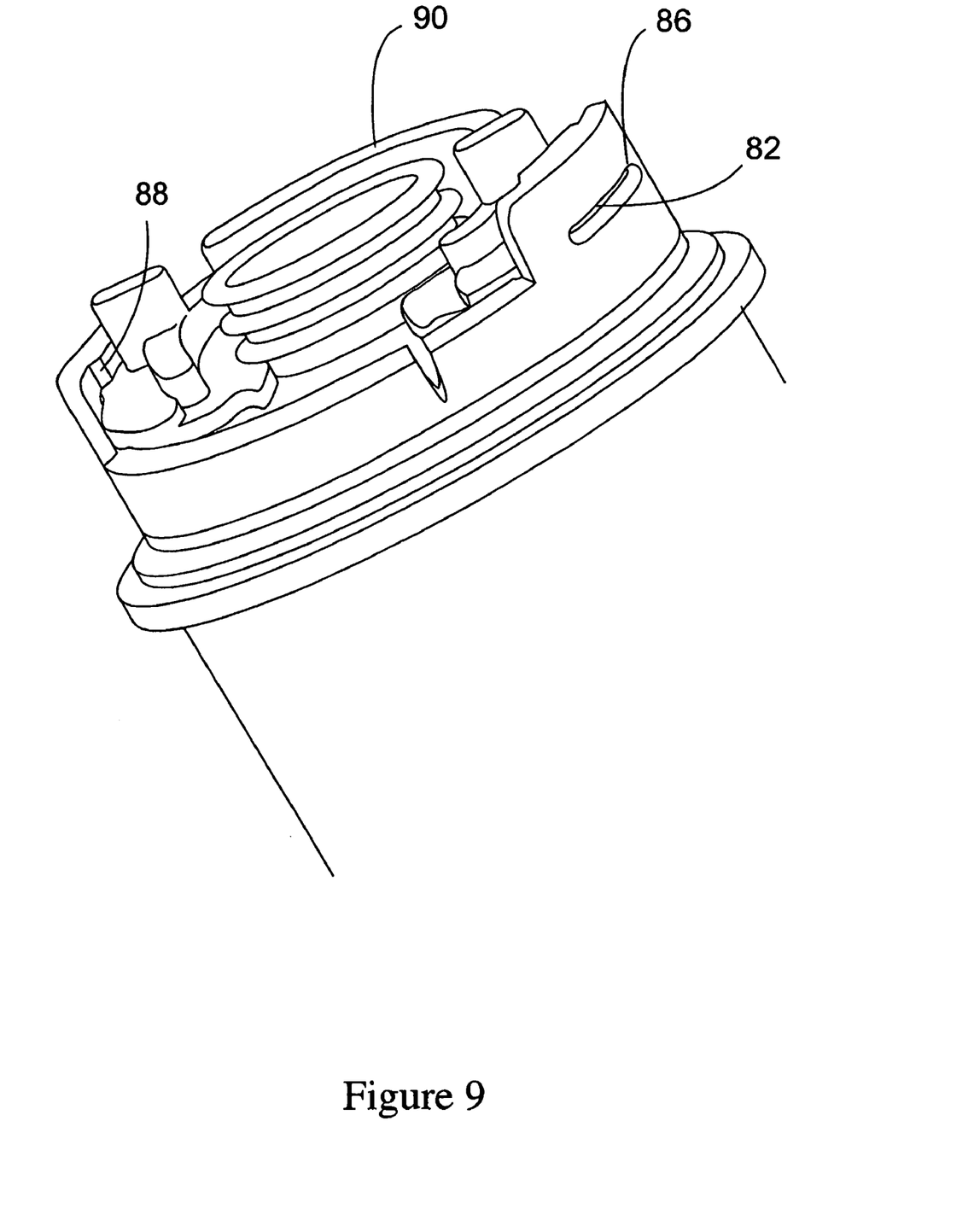
FIG. 9 is a perspective view of the key of FIG. 8 fitting with the collar of FIG. 7.

Referring to FIGS. 7, 8, and 9, the collar 84 includes two opposing slots 86 and 88 into which fit the bosses 82 when the key 90 is rotated into position into collar 84. Expansion of the slots away from each other is caused by contacting the bosses 82 with the inside surfaces of the collar 84. The distance between the outside surfaces of the bosses 82 is slightly larger than the distance between opposing inside surfaces of the collar 84.

Referring to FIG. 10, an end cap 92 of this invention comprises a fluid passageway 94 having O-rings 96 and 98. The end cap 92 includes a plate 100 having flanges 102 and 104 with grooves 112 and 114 respectively on a lower surfacee adjacent the filter medium of each of the flanges, the groove shaped to mate with an inner surface configuration of said collar attached to said bowl. The flanges 102 and 104 fit into slots of a housing such as slots 86 shown in FIG. 9. The flanges 102 and 104 also are provided with bosses 106 and 108 which promote securing the end cap 92 to the collar. The end cap 92 is secured, such as by bonding, to an end of a filter cartridge such as illustrated in FIG. 2.

Figure 11:
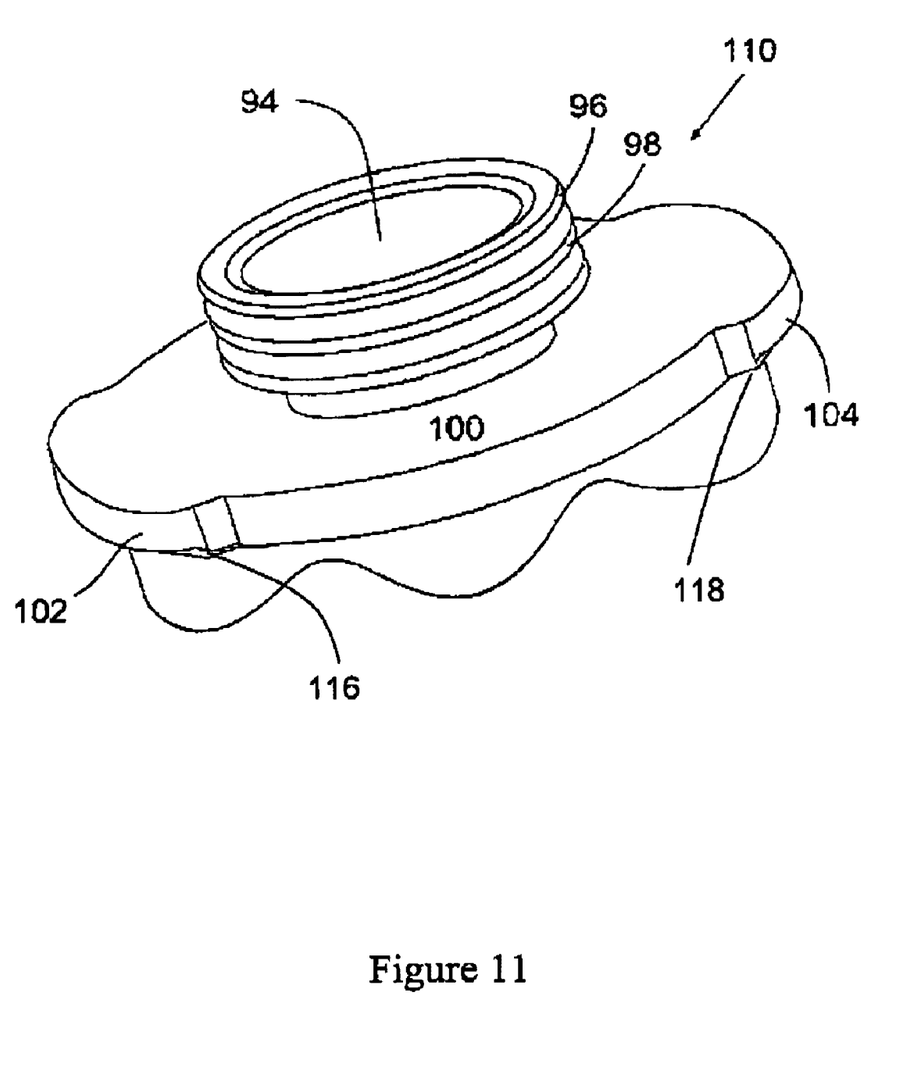
FIG. 11 is a perspective view of an alternative end cap of this invention.

Referring to FIG. 11, an alternative end cap 110 of this invention is shown. The end cap 110 does not include the bosses of the end cap of FIG. 10. The end cap 110 includes a plate 100, flanges 102 and 104 with grooves 116 and 118 respectively on a lower surface adjacent the filter medium of each of the flanges, the groove shaped to mate with an inner surface configuration of said collar attached to said bowl, a fluid passageway 94 and O-rings 96 and 98. The flanges 102 and 104 fit into slots of a collar of a bowl such as shown in FIG. 9.

The invention claimed is:

1. An apparatus which comprises:
   a bowl having a collar with slots;
   a filter cartridge that includes an elongated filter medium having a first end and a second end;
   a first end cap sealed to said first end of said elongated filter medium, said first end cap having at least two flanges formed integrally therewith, said flanges extending outward from an outer vertical surface of said filter medium;
   a boss on an outer surface of each of said flanges, each said boss configured to cause portions of the collar including the slots to expand outwardly when each said boss is rotated into position until the bosses fit into the slots of said collar;
   a second end cap sealed to said second cad of said elongated filter medium;
   a wall of a fluid passageway sealed to said first end cap to provide fluid communication to an open interior within said filter medium;
   a fluid porous housing surrounding an outside surface of said filter medium; and
   wherein the filter cartridge and bowl are locked together to be installed and removed as one piece.

2. The apparatus of claim 1 wherein said filter medium is a depth filter.

3. The apparatus of claim 1 wherein said filter medium is a pleated filter.

4. The apparatus of any one of claims 1, 2 or 3 wherein each of said flanges includes a groove on a lower surface adjacent said filter medium of each of said flanges, said groove shaped to mate with an inner surface configuration of said collar attached to said bowl.

5. The apparatus of claim 4 wherein the inside surface configuration of the collar attached to the bowl centers the filter cartridge in said bowl.

6. The apparatus of claim 4 where the slots extend through the thickness of the collar.

7. The apparatus of claim 1 where a distance between outside surfaces of the bosses is larger than the distance between opposite inside surfaces of the collar.

8. The apparatus of claim 1 where the slots extend through the thickness of the collar.

* * * * *